Figure 1:
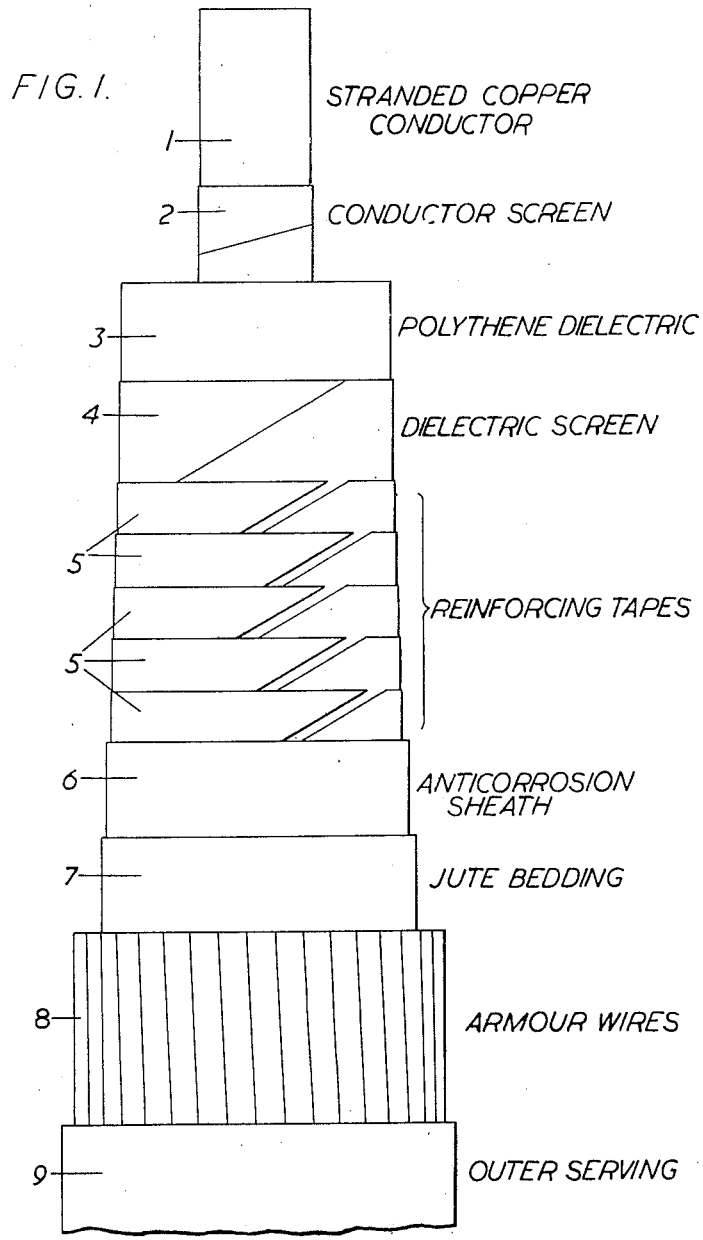

United States Patent Office 2,980,755
Patented Apr. 18, 1961

2,980,755
ELECTRIC CABLES

Ronald McLeod Fairfield, Knutsford, and Edward Leslie Davey, Hale, England, assignors to British Insulated Callender's (Submarine Cables) Limited, London, England, a British company Filed Jan. 13, 1959, Ser. No. 786,576
Claims priority, application Great Britain Jan. 20, 1958
14 Claims. (Cl. 174—24)

This invention relates to electric power cables, more particularly but not exclusively submarine cables for transmitting electric power (either A.C. or D.C.) under water, and to power cable installations utilising such cables.

The cable to which the invention relates is of the kind in which, under operating conditions, the dielectric is maintained under pressure by means of an inert gas, such as nitrogen, which is fed into the cable conductor.

The cable, in accordance with the invention, has a gas permeable stranded conductor, with or without a central duct, and a dielectric in the form of a tube of a solid polymer of ethylene (hereinafter referred to as "polythene") extruded directly over the conductor or over a gas-permeable conductive layer applied to the conductor. By a "gas-permeable" conductor we mean a stranded conductor in which the longitudinal pneumatic resistance is kept as low as possible, for example by avoiding the use of a filling compound, and in which escape of the gas laterally from the conductor is not obstructed. The conductive layer applied to the conductor may, for example, be a soft metal screening tape applied with an overlap, a conducting polythene tape applied as a continuous layer or a thin tube of conductive polythene extruded on to the conductor. When conductive polythene is used for this purpose, it may be bonded to the inner surface of the dielectric. One or more reinforcing tapes is applied to the polythene dielectric directly or over a conducting layer applied to the dielectric; this conductive layer may be of the same material as the conductive layer applied to the conductor, but we prefer to use a thin layer of relatively incompressible material such as a metal tape, applied directly to the outside of the dielectric. The strength of the reinforcement tape or tapes and their method of application is such that dilation of the polythene dielectric by gas under pressure applied, during operation of the cable, through the conductor to the inside of the dielectric is resisted. We prefer to use metal tape reinforcement, for example of bronze or steel. Over the tape reinforcement, the cable is preferably provided with an anti-corrosion sheath, armouring and suitable bedding for the armouring.

An essential feature of the cable is that the total permeability to the gas per unit length of the cable of the covering formed by all of the layers applied over the polythene is greater than, and preferably considerably greater than, the permeability per unit length of the cable of the wall of polythene dielectric.

For a single core cable we prefer to apply over the reinforcement an anti-corrosion sheath of a material permeable to gas under pressure, for example rubber or plastic, followed by a jute or similar bedding for steel wire armouring, the latter being served overall with jute or similar material. In a multi-core cable each core may be similar to the single core cable, up to and including the anti-corrosion sheath, the cores being laid up together, built up to a circular cross-section with jute or similar fillers, lapped with a tape to retain the assembly in a circular cross-section and then armoured in the same way as the single core cable.

We prefer to lap all of the reinforcing tapes in the same direction, at an angle of approximately 50–70° to the cable axis and with gaps between adjacent edges. If it is necessary, to make the cable sufficiently flexible, two or more narrow tapes may be lapped side by side to form a single layer of reinforcement. Several layers of reinforcement may be built up one over the other in the same way. Where armouring is applied helically over the reinforcement, for example steel wire armouring, this is applied with the opposite direction of lay to the reinforcement, so that when the cable is laid under tension there is very little tendency for the cable to twist.

Cable installations in accordance with the invention resemble normal gas filled cable installations in that any joints in the cable between gas feed points are provided with a gas passage from each conductor of one cable length to the corresponding conductor of the next cable length and that the cable is terminated in sealing ends provided with means for feeding gas into the conductor or conductors. Where possible, for example in submarine cable installations across straits, the cable or each cable in the installation is made as a single length without joints. In accordance with standard practice the reinforcing tapes are anchored at the sealing ends.

When the cable is used as a submarine cable, the gas pressure applied to the conductor is such that at any point on the route the inner surface of the dielectric is at a pressure of at least 25 lbs./square inch above the external water pressure. This gas pressure is maintained by means of reservoir cylinders at the cable ends and, where necessary, at intermediate points. The rate of escape of gas through the dielectric is relatively small and can be maintained on cable lengths of the order of 10 miles by means of gas fed into the conductor ends at a reasonable pressure and rate of flow, such as is obtainable from conventional storage cylinders.

If the cable is intended for use as a submarine cable, the use of hygroscopic materials, such as hydrocarbon coated paper tapes for conductor screening, is avoided.

When the cable is in operation, the gas will diffuse slowly through the dielectric, and the various layers over the dielectric, and its pressure will decrease from a maximum at the conductor surface to that of the surrounding medium at the outer surface of the cable. Under the internal gas pressure the polythene will flow or creep to some extent and will be pressed mechanically against the reinforcing tapes until the whole dielectric at any point along the length of the cable is subjected to a pressure equal to the pressure of the gas in the conductor at that point.

The polythene used as the dielectric may contain minor quantities of other materials which do not substantially affect its dielectric properties.

The main advantage of the cable in accordance with the invention and power cable installations incorporating the cable are that any voids or spaces within the dielectric are closed up and held closed by the internal gas pressure, which mechanically compresses the polythene dielectric against the reinforcing tapes. Also ingress of water is limited by the gas pressure, the mechanical stressing of the polythene improves its performance as a dielectric and the gas pressure between the conductor strand or its screening and the polythene dielectric increases the electrical stressing at which ionisation or discharge can occur. To reduce the gas spaces at the surface of the conductor, the surface of the conductor strand is preferably smoothed as by drawing through a die.

Figure 2:
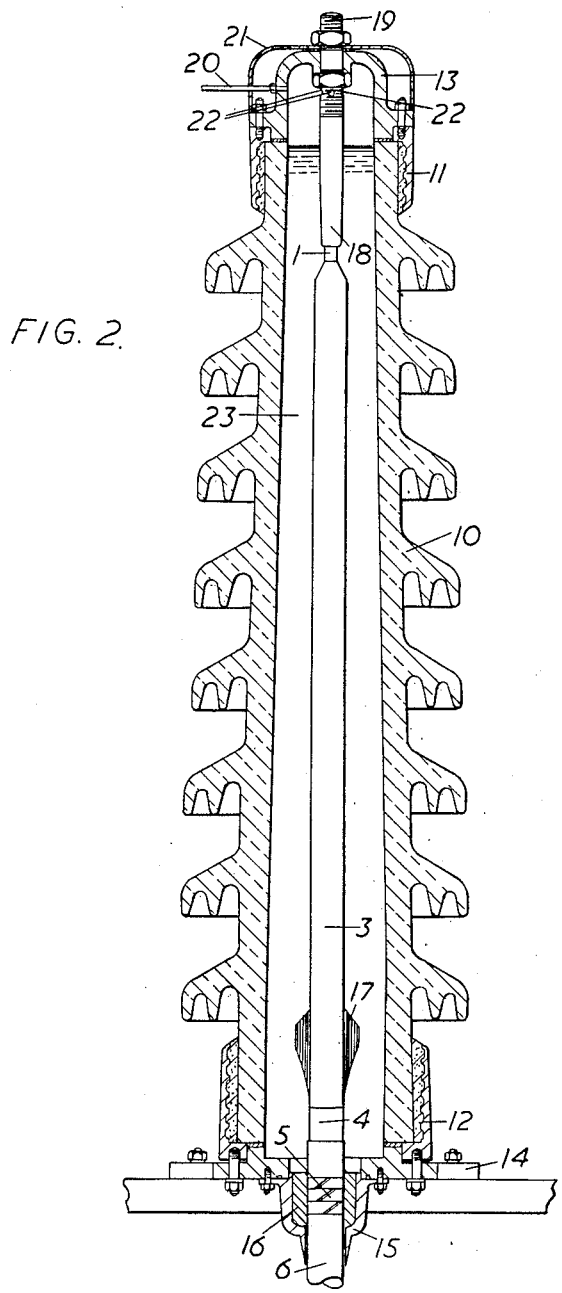

A single core cable in accordance with the invention designed for use as a 132 kv. A.C. or 200 kv. D.C. submarine power cable at a maximum depth under water of 850 feet and an installation in which the cable is used will hereinafter be described by way of example with reference to the accompanying drawing in which Figure 1 shows diagrammatically an end of the cable in elevation with various layers applied to the conductor cut back, and Figure 2 is an elevation in cross-section of a sealing end for the cable.

Referring to the drawing, the conductor 1 is a stranded copper conductor of .5 sq. in. cross-section, died down to give it a smooth surface but not to such an extent that that escape of gas radially outwards from the conductor is substantially impeded. A copper tape 2 is applied with a 50% overlap directly to the conductor as a conductor screen.

Over the conductor screen is an extruded layer 3 of polythene and a copper tape 4 is applied with a 50% overlap to the dielectric to form a dielectric screen. The layer 3 is preferably applied by a single extrusion process but it may be built up by extruding two or more concentric layers tightly fitting one upon the other.

The reinforcement for the dielectric consists of five steel tapes 5 applied all with the same direction of lay (right hand); the tapes may alternatively be made of 1% tin/bronze. An anti-corrosion sheath 6 for the reinforcement consists of an extruded layer of polythene, of the same composition as the dielectric. An alternative material for this sheath is a polyvinyl chloride compound. The cable is armoured with steel wires 8 applied with a left hand lay over a jute bedding 7 and provided with an outer serving 9 of jute strings.

When normal (i.e. low density) polythene as made by the high pressure process (for example as sold by Imperial Chemical Industries Limited as Alkathene Grade 0.3) is used for the dielectric and anti-corrosion sheath, the relative permeabilities per unit length of the cable dielectric and sheath are 1 to 18.

The permeablity of the armouring and its bedding as compared with that of the anti-corrosion sheath is such that its resistance to the passage of the gas is negligible. The permeability per unit length of the covering formed by all layers applied over the dielectric is therefore substantially eighteen times the permeability per unit length of the dielectric wall.

When a 20 mile run of the cable without joints passes under water to a maximum depth of 850 feet the nitrogen gas pressure applied to both ends is 400 lbs. per sq. in. measured at 20° C.

The thicknesses of the various layers are as set out in the following table:

|  | Radial thickness, Inches | Total radial thickness, Inches |
|---|---|---|
| Conductor (1) | .442 | .442 |
| Conductor screen (2) | .01 | .452 |
| Dielectric (3) | .6 | 1.052 |
| Dielectric screen (4) | .01 | 1.062 |
| Reinforcement (5) | .05 | 1.112 |
| Anti-corrosion sheath (6) | .05 | 1.162 |
| Armour (7) | .232 | 1.444 |
| Armour bedding (8) | .05 | 1.212 |
| Serving (9) | .1 | 1.544 |

In addition to resisting dilation of the polythene dielectric, the tape reinforcement counteracts the twisting effect due to the armouring when the cable is under tension. The strength of the tape is such that it performs both these functions along the whole of a cable length. To resist dilation of the dielectric, the reinforcement effect generally needs to be greatest at the shore end of a length of submarine cable and can decrease to a minimum at the deepest part of the route. From the point of view of preventing twisting of the cable under the action of the armouring, the torque effect of the reinforcement generally needs to be least at the shore end and to increase to a maximum at the deepest part of the route. Both of these effects are taken into account when calculating the strength of the tape and the number of layers to be used.

Referring to Figure 2, the sealing end comprises a porcelain tube 10 provided with metal end rings 11, 12 and upper end cover 13 and a lower end plate 14. The end of the cable, shown for simplicity without the armouring and the bedding and the serving for the armouring, passes through a metal gland 15 which fits closely on to the anti-corrosion sheath 6 and in which it is sealed by cast resin 16, preferably a cold setting resin, for example of the epoxy type. In most cases the resin seal will provide sufficient anchorage for the ends of the reinforcing tapes 5 but additional mechanical anchorage may be provided, if necessary. Anchorage for the armouring (not shown) is conventional.

A stress cone 17 is built up on the dielectric 3 by lapping on polythene tape. The bare end of the conductor 1 passes into and is soldered to a copper connector 18 which is integral with the upper end terminal 19 of the sealing end. A gas feed pipe 20 passes through an outer cover 21 into the end cap 13 and gas under pressure fed through this pipe can pass through apertures 22 in the end terminal 19 into the conductor 1.

The sealing end is filled with an insulating compound 23 which may be a bituminous compound of a kind which does not attack polythene but we prefer to use an insulating oil and to protect the polythene by a silk tape lapping which extends over the whole length of the exposed dielectric 3 and the stress cone 17 and overlaps the anti-corrosion sheath 6 and the copper connector 18, to both of which it is secured by wire bindings. We prefer to use six layers of tape and to impregnate the tape with an oil resisting varnish.

A submarine cable installation in accordance with the invention may consist of a number of lengths of the cable laid side by side, each length being continuous without joints over the whole route and being terminated at each end by a sealing end of the kind shown in Figure 2.

Gas under pressure may be fed into each of the sealing ends through the gas feed pipes 20 from gas feed sealing ends of the kind which are the subject of our application Serial No. 634,021 or from any other suitably insulated source.

What we claim as our invention is:

1. An electric power cable comprising a gas permeable stranded conductor, an inert gas, at a pressure substantially above the external pressure on the outer surface of the cable, filling the interstices in said conductor, a dielectric in the form of a tube of polythene extruded over the conductor, and reinforcement which resists dilation of the dielectric in the form of at least one tape applied thereto, the permeability to the gas per unit length of cable of the covering formed by all of the layers applied over the polythene dielectric being greater than the permeability per unit length of cable of the wall of polythene dielectric.

2. An electric power cable comprising a gas permeable stranded conductor, an inert gas, at a pressure substantially above the external pressure on the outer surface of the cable, filling the interstices in said conductor, a dielectric in the form of a tube of polythene extruded over the conductor, metal tape reinforcement for the dielectric which resists dilation thereof, and an anti-corrosion sheath applied over the reinforcement, the total permeability to the gas per unit length of the cable of the covering formed by all of the layers applied over the polythene dielectric being greater than the permeability per unit length of cable of the wall of polythene dielectric.

3. An electric power cable comprising a gas permeable stranded conductor, an inert gas, at a pressure substantially above the external pressure on the outer surface of the cable, filling the interstices in said conductor, a dielectric in the form of a tube of polythene extruded over the conductor, reinforcement which resists dilation of the dielectric in the form of a plurality of tapes helically applied thereto with the same direction of lay, and armouring helically applied over the reinforcement with the opposite direction of lay, the total permeability to the gas per unit length of cable of the covering formed by all of the layers applied over the polythene dielectric being greater than the permeability per unit length of cable of the wall of polythene dielectric.

4. A cable as claimed in claim 1 in which a gas permeable conductive layer is applied between the conductor and its dielectric.

5. A cable as claimed in claim 1 in which a gas permeable conductive layer of relatively incompressible material is applied directly to the dielectric of the conductor beneath the reinforcement.

6. A multi-core electric power cable comprising a plurality of cores each comprising a gas permeable stranded conductor, an inert gas, at a pressure substantially above the external pressure on the outer surface of the cable, filling the interstices in said conductor, a dielectric in the form of a tube of polythene extruded over the conductor and reinforcement which resists dilation of the dielectric in the form of at least one tape applied thereto and a common protective covering enclosing the cores, the total permeability to the gas per unit length of cable of the protective covering formed by all of the layers applied over the polythene dielectric of each core, including the common covering, being greater than the permeability per unit length of cable of the wall of polythene dielectric applied to the conductor of said core.

7. A cable as claimed in claim 6 in which a gas permeable conductive layer is applied between each conductor and its dielectric.

8. A cable as claimed in claim 6 in which a gas permeable conductive layer of relatively incompressible material is applied directly to the dielectric of each conductor beneath the reinforcement.

9. An electric power cable installation comprising a cable having a gas permeable stranded conductor, a dielectric in the form of a tube of polythene extruded over the conductor and reinforcement which resists dilation of the dielectric, in the form of at least one tape, and means for feeding an inert gas into the cable conductor at a pressure such that, at any point on the cable route, the inner surface of the dielectric is maintained at a pressure substantially higher than the external pressure on the cable, the total permeability to the gas per unit length of cable of the covering formed by all of the layers applied over the polythene dielectric being greater than the permeability per unit length of cable of the wall of polythene dielectric over the same length.

10. A submarine electric power cable installation comprising a cable having a gas permeable stranded conductor, a dielectric in the form of a tube of polythene extruded over the conductor, reinforcement which resists dilation of the dielectric, in the form of a number of tapes helically applied with the same direction of lay, and armouring helically applied over the reinforcement with the opposite direction of lay, and means for feeding an inert gas into the cable conductor at a pressure such that, at any point on the cable route, the inner surface of the dielectric is maintained at a pressure substantially higher than the external pressure on the cable, the total permeability to the gas per unit length of cable of the covering formed by all of the layers applied over the polythene dielectric being greater than the permeability per unit length of cable of the wall of polythene dielectric.

11. An electric power cable installation comprising a cable as claimed in claim 6 and means for feeding an inert gas into each cable conductor at a pressure such that, at any point on the cable route, the inner surface of the dielectric of said conductor is maintained at a pressure substantially higher than the external pressure on the cable.

12. An electric power cable comprising a gas permeable stranded conductor, a gas permeable conductive layer applied to the conductor, an inert gas, at a pressure substantially above the external pressure on the outer surface of the cable, filling the interstices in said conductor, a dielectric in the form of a tube of polythene extruded over said conductive layer and reinforcement which resists dilation of the dielectric in the form of one or more tapes applied thereto, the permeability to the gas per unit length of cable of the covering formed by all of the layers applied over the polythene dielectric being greater than the permeability per unit length of cable of the wall of polythene dielectric.

13. An electric power cable, of the kind in which the dielectric is maintained under pressure during operating conditions by means of an inert gas which is fed into the cable conductor, comprising a gas permeable stranded conductor, a dielectric in the form of a tube of polythene extruded over the conductor and reinforcement for the dielectric, in the form of at least one tape, which resists dilation of the dielectric during operation of the cable, the permeability to the gas per unit length of cable of the covering formed by all of the layers applied over the polythene dielectric being greater than the permeablity per unit length of cable of the wall of polythene dielectric.

14. A multi-core electric power cable, of the kind in which the dielectric of each conductor is maintained under pressure during operating conditions by means of an inert gas which is fed into the conductor, in which each core comprises a gas permeable stranded conductor, a dielectric in the form of a tube of polythene extruded over the conductor and reinforcement for the dielectric, in the form of at least one tape, which resists dilation of the dielectric during operation of the cable and the cores are enclosed in a common protective covering, the total permeablity to the gas per unit length of cable of the protective covering formed by all of the layers applied over the polythene dielectric of each core, including the common covering, being greater than the permeability per unit length of cable of the wall of polythene dielectric.

References Cited in the file of this patent

UNITED STATES PATENTS

| 1,730,740 | Morrison | Oct. 8, 1929 |
| 2,531,156 | Piercy | Nov. 21, 1950 |
| 2,650,261 | Davey | Aug. 25, 1953 |
| 2,754,352 | Connell | July 10, 1956 |

FOREIGN PATENTS

| 553,716 | Great Britain | June 2, 1943 |
| 450,295 | Canada | Aug. 3, 1948 |
| 480,891 | Canada | Feb. 5, 1952 |
| 675,244 | Great Britain | July 9, 1952 |